United States Patent [19]

Arends

[11] 3,884,188
[45] May 20, 1975

[54] PIGLET KNEE PROTECTOR
[76] Inventor: David J. Arends, R.R. No. 3, Luverne, Minn. 56156
[22] Filed: Mar. 17, 1972
[21] Appl. No.: 235,499

[52] U.S. Cl. .................. 119/20; 119/28; 52/177
[51] Int. Cl. .................................... A01k 1/02
[58] Field of Search .......... 119/20, 28; 15/215, 216

[56] References Cited
UNITED STATES PATENTS

| | | | |
|---|---|---|---|
| 2,081,334 | 5/1937 | Kickenbush | 119/28 |
| 2,082,928 | 6/1937 | Wilhelmy | 15/215 X |
| 3,209,728 | 10/1965 | Beckers | 119/20 |
| 3,237,600 | 3/1966 | Behrens et al. | 119/20 |

Primary Examiner—Louis G. Mancene
Assistant Examiner—J. N. Eskovitz
Attorney, Agent, or Firm—Merchant, Gould, Smith & Edell

[57] ABSTRACT

A pad is disclosed for use on the floor of a farrowing crate for aiding piglets in nursing while protecting their front knees. The pad has a smooth top surface disposed on that part of the farrowing crate floor normally occupied by the front knees of a nursing piglet and a rough surface portion disposed on that part of the farrowing crate floor normally occupied by the hind feet of the nursing piglets. The piglets utilize the rough portion in order to gain a secure footing while the smooth portion provides a slippery surface for the front knees to slide upon when the piglet is nursing.

4 Claims, 4 Drawing Figures

PIGLET KNEE PROTECTOR

BACKGROUND OF THE INVENTION

1. Field of the Invention

This invention relates generally to animal husbandry and more particularly concerns a protective floor for a piglet farrowing crate.

2. Description of the Prior Art

For the milking of piglets, a farrowing crate is used wherein the sow is generally contained within a center portion of the crate and the piglets are in portions located outside of the sow containing portion. With the use of a farrowing crate, the sow is restrained from rolling over upon the piglets and injuring them. In order that the piglets may nurse low openings are provided in the sow containing portion so that the piglets can nurse the sow's udder while remaining principally within the piglet containing portion of the crate. In order to assume a position low enough in order to milk from the udder, a piglet will support himself by his front knees while his hind feet will generally remain in contact with the ground and will provide a pushing action. The piglet uses a considerate amount of pushing with the hind feet and spinning of the front knees in attempting to maintain a nipple and at the same time massaging the udder to stimulate milk flow. When this spinning occurs on rough surfaces, the skin on their front knees wears off. Frequently knee abrasions are so severe that leg bones are actually exposed. Infectious bacteria, primarily streptococci organisms, enter through the open knee wounds and settle in the leg joints, producing the condition referred to as streptococco arthritis. The organisms produce such enlarged and eventually painful swelling in the joints that the piglets have difficulty moving around. Thus, they are unable to nurse and malnutrition soon reduces the vitality and the resistance of the pigs. Death frequently follows.

OBJECTS AND SUMMARY OF THE INVENTION

It is therefore a primary object of the present invention to provide a pad for a farrowing crate which aids the piglets in nursing and prevents knee abrasions. The pad has a portion with a rough surface for providing secure footing for the hind legs of the nursing piglet, and a portion providing a smooth surface for the front knees of the piglet to slip upon for preventing knee abrasions.

BRIEF DESCRIPTION OF THE DRAWINGS

Other objects and advantages of the invention will become apparent upon reading the following detailed description and upon reference to the drawings, in which.

DETAILED DESCRIPTION OF THE DRAWINGS

Figure 1:
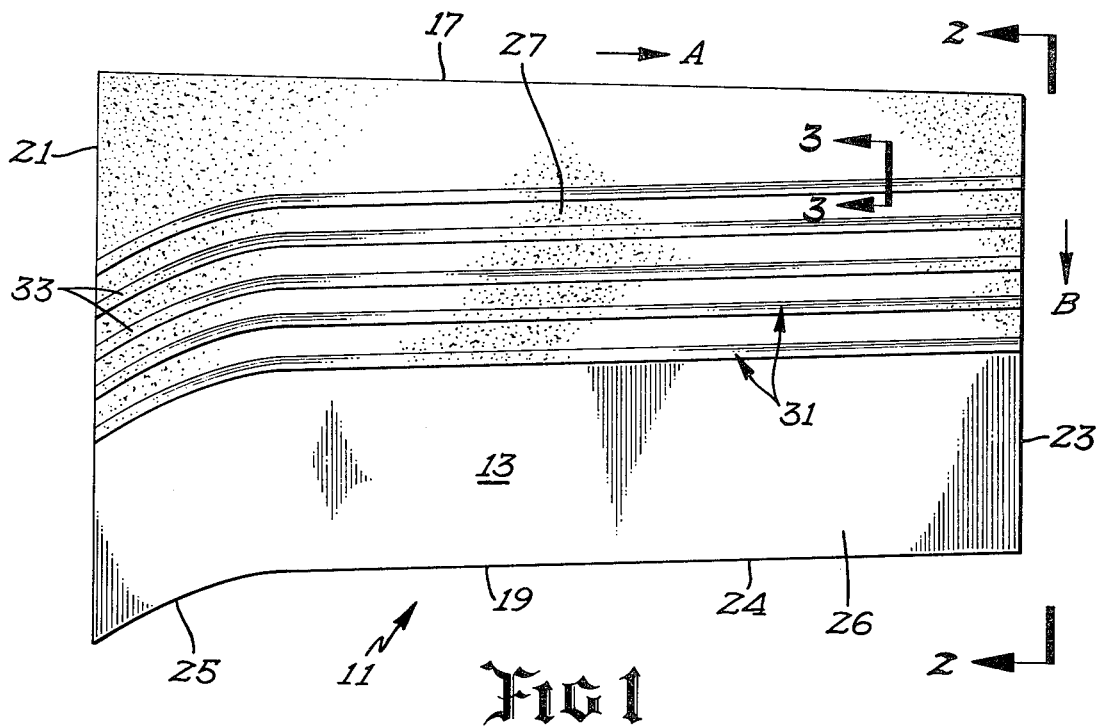
FIG. 1 is a top plan of the knee protecting pad of the present invention.
Figure 2:
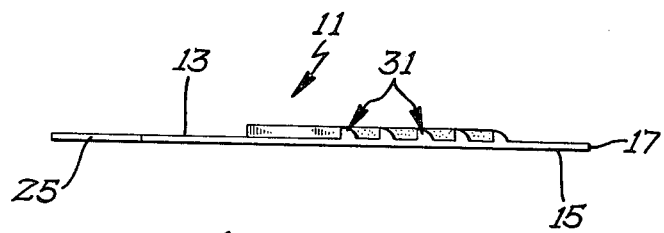
FIG. 2 is a view along line 2—2 of FIG. 1.
Figure 3:
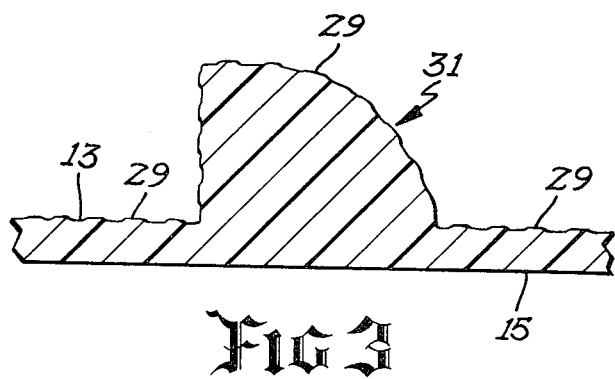
FIG. 3 is a view along line 3—3 of FIG. 1.

Referring now to the drawings, the numeral 11 generally refers to the piglet knee protector pad of the present invention. The knee protector 11 is generally elongated in a longitudinal direction A. For purposes of describing the present invention the transverse direction is designated B. Knee protector 11 is shown having a top surface 13, a bottom surface 15, a back edge 17, a forward edge 19, a first side edge 21, and a second side edge 23. Edges 17, 21 and 23 are generally straight whereas edge 19 has a straight section 24 and also a curvilinear section 25. As will be discussed, section 25 is curved in the contour of a sow's udder.

Top surface 13 of knee protector 11 contains a portion 26 which is smooth and a portion 27 which is rough. Rough portion 27 has a multitude of tiny protrusions 29 and it additionally has ridges 31 which are quarter-round shaped. As will be appreciated, for rough portion 27, the ridges 31 provide the primary foot securing function and protrusions 29 may be eliminated if desired. Ridges 31 are transversely spaced apart and extend generally longitudinally and parallel with edge 19. Toward the edge 21 of the knee protector 11 each of the ridges 31 branches off at an angle generally parallel with the curved portion 25 of edge 19 and consequently parallel to the sow's udder. The angularly disposed portion of the ridges 31 is designated 33.

The knee protector pad 11 is constructed of fiberglass secured together by a glucose material. The use of fiberglass bonded with glucose is very well known in the art. The combination of fiberglass and glucose can be formed to a very hard smooth surface as at portion 26 and to a rough surface having ridges 31 therein as at portion 27. The fiberglass-glucose combination has proven, through experimentation, to be a very durable material. For instance, a sow will intentionally easily destroy a rubber pad but the fiberglass-glucose material stands up well to the abuse of the sow. It has also been found through experimentation that a glucose secured fiberglass material is superior to rubber in other respects and also to cement. The ever present urine from the sow or piglets will pit and corrode both rubber and cement, whereas the fiberglass material does not deteriorate.

The pad 11 may be easily constructed by first building a form having a smooth portion 26 and with a portion 27 with quarter-rounds and a high degree of roughness. From this model, a mold may be easily formed. Then, for constructing the pad 11, a layer of the glucose is painted upon the mold and the fiberglass and glucose composition is then formed in the mold. The completed knee protector pad 11 can then be removed from the mold after it has solidified.

Figure 4:
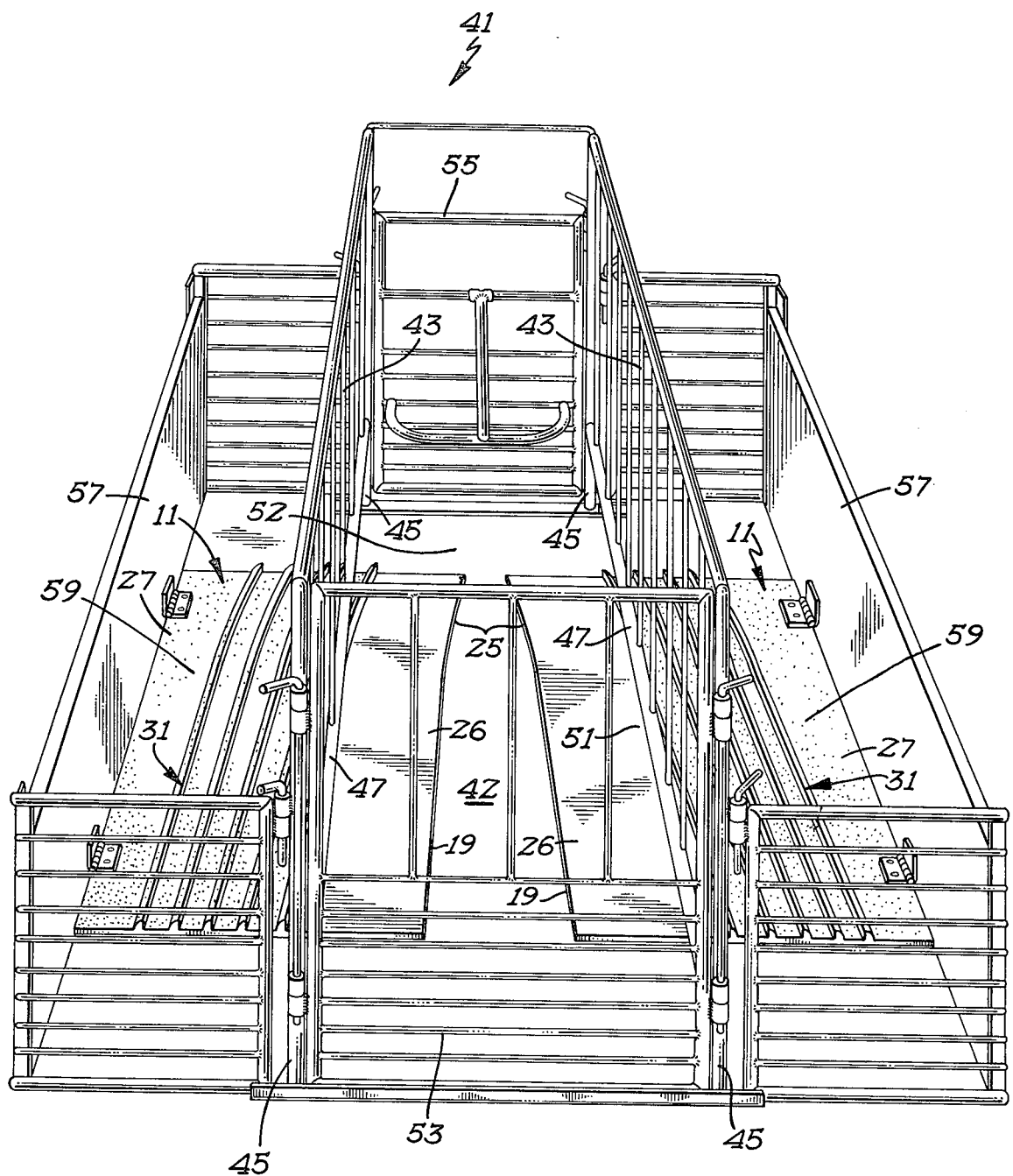
FIG. 4 is a view in perspective of the knee protecting pad of the present invention shown with a farrowing crate.

Referring now to FIG. 4 there is shown a farrowing crate 41 having two piglet knee protector pads 11 disposed within the bottom 42 of the crate 41. The farrowing crate is elongated having a pair of vertically extending spaced apart longitudinally disposed walls 43 located upon posts 45. Posts 45 place the bottom edge 46 of the walls 43 a sufficient distance off of the bottom 42 of the farrowing crate 41 to allow piglets to partially crawl through the hole 51 defined by the floor 42 and the bottom edge 47. End walls 53 and 55 extend transversely between each side wall 43 and cooperate with side walls 43 to define a sow containing portion 52 of the crate 41. The various end walls of the farrowing crate 41 can be hinged in order to provide a gate or door in which to introduce or take out the sow or piglets. For nursing, a sow (not shown) is located within the farrowing crate 41 in a longitudinally extending direction with the sow's head toward end wall 53. Transversely spaced and located outward and on each side of walls 43 are vertically extending longitudinally disposed walls 57. Walls 57 cooperate with walls 43 and an end wall 53 or wall 55 to form the piglet containing portions 59 of the farrowing crate.

Pads 11 are situated within the farrowing crate 41 such that each edge 19 generally contours the udder of a sow when the sow is located within sow containing portion 52. Portion 26 of edge 19 must be slightly curvilinear as the nipples near the rear of the sow's udder tend to be higher than at the middle of the udder since the sow's udder sags as the sow ages. Thus, the smooth surface 26 for slippage and ridge portions 31 must be provided nearer the sow at the rear of the udder since the piglets will locate themselves nearer the sow to reach the rear nipples.

Within the farrowing crate 41 there are shown two pads 11 since it is generally desirable to not place any pad material beneath the sow as the sow will attempt to damage whatever material is located beneath her. However, if desirable, rather than using two pads 11 a single pad 11 could be provided which has the desired smooth portion 26 contouring the udder of the sow so as to provide a slippage surface for the knees of the piglets and the rough portion 27 for the piglets to secure their rear footing. Additionally, the pad 11 could be merely part of the floor 42.

When nursing, the sow is placed within portion 52 and the piglets are placed within portion 59. In order to assume a position low enough in order to milk from the udder, a piglet will generally support himself on his front knees while his hind feet will generally remain in contact with the ground and will provide a pushing action. During milking the piglets have difficulty in maintaining the nipple and at the same time massaging the udder to stimulate milk flow. This difficulty results in the piglets engaging in pushing with the hind feet and spinning of the front knees. In order to aid the piglet in his pushing action, the rough portion 27 having the ridges 31 provides a surface for bracing the hind feet. However, even with the hind feet braced, the piglets engage in a considerable amount of spinning of their front knees. When this spinning occurs on rough surfaces, the skin on the front knees wears off allowing infectious bacteria to enter the wounds. In order to prevent the skinning of the front knees of the piglets, the knee protector 11 of the present invention contains the portion 26 having the smooth surface.

When the knee protector 11 is placed upon the floor 42 of the farrowing crate, the smooth portion 26 of the pad is disposed in a position normally occupied by the front knees of the piglets when they are nursing. This position is generally within the sow containing portion 52 of the farrowing crate. The rough portion 27 of the knee protector 11 is disposed in a position normally occupied by the rear feet of the piglet for providing a secure footing to the piglets when they are nursing. The rough portion 27 is thus located generally within the piglet containing portion 59 of the farrowing crate 41. The transverse width of the portions 26 and 27 are selected for enabling the piglets to brace their hind feet on the second portion while the front knees of the piglets slide upon the smooth surface 26 during nursing. By providing the pad 11 having a rough surface 27 for piglets to gain a secure footing in addition to a smooth surface 26 for the piglet's front knees to rub against, it has been found that knee abrasions are eliminated.

Thus, it is apparent that there has been provided, in accordance with the invention, a piglet knee protector pad that fully satisfies the object of aiding the piglets in nursing while protecting the piglet's front knees. While the invention has been described in conjunction with a specific embodiment thereof, it is evident that many alternatives, modifications and variations will be apparent to those skilled in the art in light of the foregoing description. Accordingly, it is intended to embrace all such alternatives, modifications, and variations which fall within the spirit and broad scope of the appended claims.

What is claimed is:

1. In a farrowing crate having a sow containing portion, a piglet containing portion on a side of said sow containing portion, and an open space between said piglet containing portion and said sow containing portion for piglets to reach the udder of a sow, an improved floor for said farrowing crate, comprising:
   a. a first portion having a smooth surface located primarily within said sow containing portion of said farrowing crate, said portion having a predetermined length sufficient to extend longitudinally along the udder of said sow and extending transversely a predetermined distance;
   b. a second portion having a rough surface located primarily within said piglet containing portion, said second portion extending longitudinally along said first portion and extending transversely a predetermined distance; and
   c. said second portion extending transversely a predetermined distance for allowing piglets to brace their hind feet thereon and said first portion extending transversely a predetermined distance such that when said piglets have braced their hind feet on said second portion, said piglet's front knees will slip upon said smooth surface of said first portion when said piglets are nursing.

2. A farrowing crate, comprising:
   a. a bottom floor;
   b. a forward vertically extending wall;
   c. a rearward vertically extending wall;
   d. a first pair of spaced apart longitudinally extending side walls connecting said forward and rearward walls;
   e. a second pair of spaced apart longitudinally extending walls disposed inwardly of said side walls;
   f. said second pair of walls cooperating with said forward and said rearward walls to define a sow containing portion of said crate;
   g. said second pair of walls cooperating with said first pair of walls and said forward and rearward walls to define a pair of piglet containing portions of said farrowing crate;
   h. said second pair of spaced apart longitudinally extending walls having a longitudinally extending open portion at the bottom thereof allowing piglets contained within said piglet containing portion to reach the udder of a sow located within said sow containing portion;
   i. a pair of pads located upon said bottom floor;
   j. each of said pads having a first portion with a smooth top surface located primarily within said sow containing portion of said farrowing crate, said surface having a predetermined length sufficient to extend longitudinally generally along the length of the udder of said sow and having a width extending transversely a predetermined distance;

k. each of said pads having a second portion with a rough surface located primarily within said piglet receiving portion of said farrowing crate, said surface having a length extending longitudinally along the longitudinally extending length of said first portion and having a width extending transversely a predetermined distance; and 1. said predetermined distance of said transversely extending first portion and said predetermined distance of said transversely extending second portion being selected for enabling piglets to brace their hind feet on said second portion while the front knees of said piglets slip upon said smooth surface of said first portion when said piglets are nursing.

3. A method of providing secure footing to piglets while preventing knee abrasions to said piglets when said piglets are nursing in a farrowing crate with a sow containing portion, a piglet containing portion on a side of said sow containing portion, and an open space between said piglet containing portion and said sow containing portion for piglets to reach the udder of a sow, by utilizing a pad having a first portion with a smooth top surface and a second portion having a rough top surface, the method consisting of placing said first portion of said protective pad primarily within said sow containing portion of said farrowing crate and placing said second portion of said protective pad primarily within said piglet containing portion of said farrowing crate.

4. The method of claim 3 wherein said pad utilized is placed longitudinally along the udder of a sow and includes a plurality of transversely spaced apart protrusions each disposed longitudinally for following the udder of a sow.

* * * * *